US008968043B1

(12) United States Patent
Murphy

(10) Patent No.: US 8,968,043 B1
(45) Date of Patent: Mar. 3, 2015

(54) METHOD AND APPARATUS FOR TOTAL CONTROL HANDLE

(71) Applicant: Michael Murphy, Canyon Lake, CA (US)

(72) Inventor: Michael Murphy, Canyon Lake, CA (US)

( * ) Notice: Subject to any disclaimer, the term of this patent is extended or adjusted under 35 U.S.C. 154(b) by 57 days.

(21) Appl. No.: 13/690,480

(22) Filed: Nov. 30, 2012

Related U.S. Application Data

(60) Provisional application No. 61/629,977, filed on Dec. 2, 2011.

(51) Int. Cl.
| | |
|---|---|
| *B63B 35/85* | (2006.01) |
| *G08B 21/02* | (2006.01) |
| *G08B 21/08* | (2006.01) |
| *H04B 1/034* | (2006.01) |
| *B63B 35/81* | (2006.01) |

(52) U.S. Cl.
CPC .............. *B63B 35/817* (2013.01); *G08B 21/08* (2013.01); *G08B 21/088* (2013.01); *G08B 21/0233* (2013.01); *H04B 1/0343* (2013.01)
USPC ....... 441/69; 340/573.6; 340/686.6; 340/984; 455/100

(58) Field of Classification Search
USPC ............... 441/69; 114/253; 340/573.6, 686.6, 340/984; 455/100
See application file for complete search history.

(56) References Cited

U.S. PATENT DOCUMENTS

| | | | | | |
|---|---|---|---|---|---|
| 3,018,474 | A | * | 1/1962 | Cluck et al. | 340/332 |
| 3,062,172 | A | * | 11/1962 | Moore | 440/84 |
| 3,103,005 | A | * | 9/1963 | Hills | 340/984 |
| 4,483,683 | A | * | 11/1984 | Alley, Sr. | 441/69 |
| 4,689,611 | A | * | 8/1987 | Franklin | 340/539.26 |
| 5,041,040 | A | * | 8/1991 | Jones et al. | 441/69 |
| 5,343,189 | A | * | 8/1994 | Alley, Sr. | 340/539.26 |
| 5,408,221 | A | * | 4/1995 | Carsella et al. | 340/604 |
| 5,550,531 | A | * | 8/1996 | Little-Lowry | 340/573.6 |
| 6,603,402 | B2 | * | 8/2003 | Lentine et al. | 340/573.6 |
| 6,822,572 | B2 | * | 11/2004 | Lentine et al. | 340/573.6 |
| 7,109,871 | B2 | * | 9/2006 | Lentine et al. | 340/573.6 |
| 2005/0124234 | A1 | * | 6/2005 | Sells et al. | 440/33 |
| 2007/0096948 | A1 | * | 5/2007 | La Barbera | 341/22 |
| 2009/0009364 | A1 | * | 1/2009 | St-Pierre et al. | 340/984 |

* cited by examiner

*Primary Examiner* — Ajay Vasudeva
(74) *Attorney, Agent, or Firm* — Heimlich Law, PC; Alan Heimlich, Esq.

(57) ABSTRACT

By using the intelligent ski handle capable of communicating with a tow boat, a towed user can control functions such as raising a warning flag, changing the speed and direction of the boat, sounding a horn, etc. thus promoting safety of the rider. When the towed user is separated by a prespecified distance from the ski handle, the handle can sense a fallen rider and wirelessly transmit a control signal to a receiver on the towing boat.

4 Claims, 7 Drawing Sheets

US 8,968,043 B1

METHOD AND APPARATUS FOR TOTAL CONTROL HANDLE

RELATED APPLICATION

The present Application for Patent claims priority to U.S. Provisional Patent Application No. 61/629,977 entitled "Total Control Handle" filed Dec. 2, 2012, and is hereby incorporated herein by reference.

FIELD OF THE INVENTION

The present invention pertains to water sports. More particularly, the present invention relates to a Method and Apparatus for Total Control Handle.

BACKGROUND OF THE INVENTION

In several water sports, for example, but not limited to, wakeboarding, waterskiing, kneeboarding, etc., the user riding the water on the wakeboard, ski, etc. referred to as the "user" or "skier" or "rider" is towed by holding on to a handle attached via a rope to a speeding boat. When the rider falls, or let's go of the handle they are "down in the water" referred to as "fallen" or "down". Often the rider tries to communicate to the boat operator commands such as turn left, turn right, speed up, I'm down, etc. However to do this behind a noisy boat at high speed where possibly the operator of the boat is the only person in the boat and is not looking backwards (since they are steering the boat) presents a technical problem for which a technical solution using a technical means is needed.

BRIEF DESCRIPTION OF THE DRAWINGS

The invention is illustrated by way of example and not limitation in the figures of the accompanying drawings in which.

DETAILED DESCRIPTION

Figure 1:
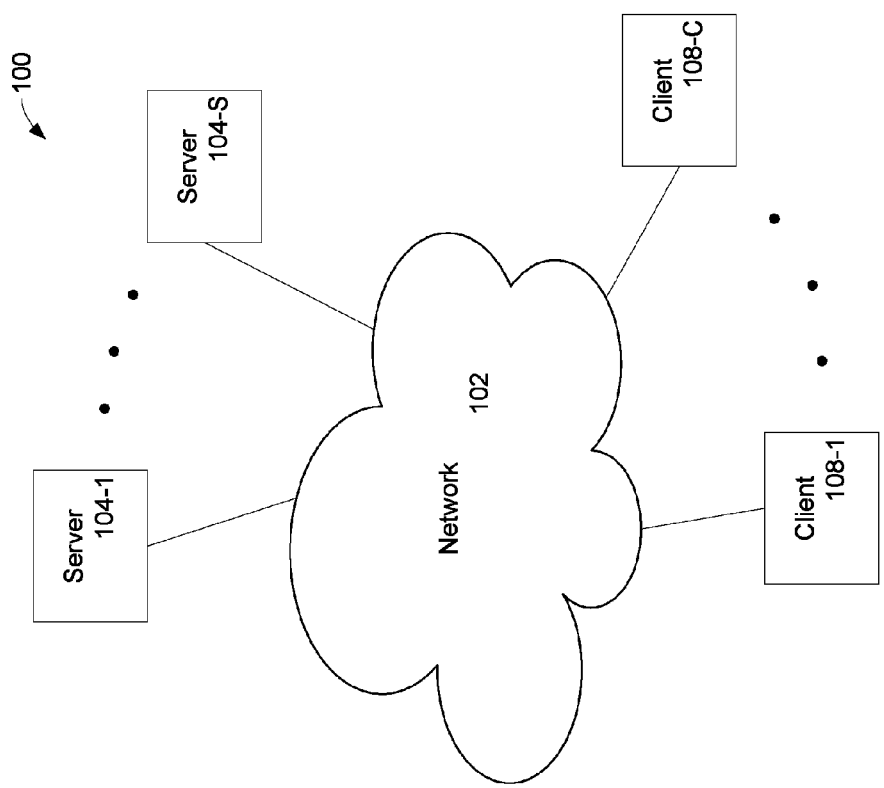
FIG. 1 illustrates a network environment from which the techniques described may be accessed and/or controlled.

In one embodiment of the invention, the handle pulls the rider through the water and allows the rider to control the volume of one or more speakers, for example, but not limited to, stereo speakers.

In one embodiment of the invention, the handle allows the rider to sound a horn.

In one embodiment of the invention, the handle allows the rider to raise the ski warning flag (rider down).

In one embodiment of the invention, the handle allows the rider to control the speed of the boat.

In one embodiment of the invention, the handle allows the rider to control the direction of the boat.

In one embodiment of the invention, the handle allows the boat driver's rear view mirror track the rider.

In one embodiment of the invention, the handle has an automatic release electronic sensor to release the handle from a tow rope or the tow rope from boat, in the event that the rider gets an arm or body any parts caught in the handle.

In one embodiment of the invention, by allowing the user to adjust volume on the handle will allow for better communications between the boat operator and/or passengers and the rider as well as allowing the rider to adjust music volume to changing conditions.

In one embodiment of the invention, by allowing the rider to sound a horn will add another set of eyes to oncoming traffic, since most passengers in boats are sitting backwards to watch the rider behind boats.

In one embodiment of the invention, by allowing the rider to raise the warning flag will speed up the raising of the warning flag and assist in recovery and safety. That is without a person, the rider can raise the warning flag.

In one embodiment of the invention, by allowing the rider to control the speed of the boat the rider has the ability to control his/her speed and will have less chance of being pulled too fast or too slow while performing tricks/maneuvers. This also promotes safety.

In one embodiment of the invention, by having the boat driver's rear view mirror track the rider, the boat driver will have 100% view of the rider at all times and will not have to rely on passengers to tell him/her when the rider falls.

In one embodiment of the invention, by having the handle automatically release the rope or handle will prevent serious injury to rider.

In one embodiment of the invention, electronic applications (aps) can be added to the handle.

In one embodiment of the invention, the handle has wireless communications/control capability to which wireless electronic applications (aps) can be added to the handle.

In one embodiment of the invention, from one to multiple aps may be run on the handle.

In one embodiment of the invention, in one ap the handle can sense a fallen rider, for example, by the handle not being gripped for a period of time (e.g. 3 seconds) and notify the boat operator that the rider has likely fallen.

In one embodiment of the invention, in one ap the handle can sense a fallen rider, for example, by the handle and the rider being separated by a distance (e.g. 20 feet) and notify the boat operator that the rider has likely fallen. In one embodiment, for example, in this ap the rider would have attached to them, for example, but not limited to, a wireless system, which the handle can use to sense distance (e.g signal strength, round trip time, etc).

In one embodiment of the invention, one or more aps the handle can sense a fallen rider and notify the boat operator of such and also initiate automatic actions such as, but not limited to, raising a flag, emptying ballasts, slowing the boat, locating the fallen rider, etc.

Figure 3:
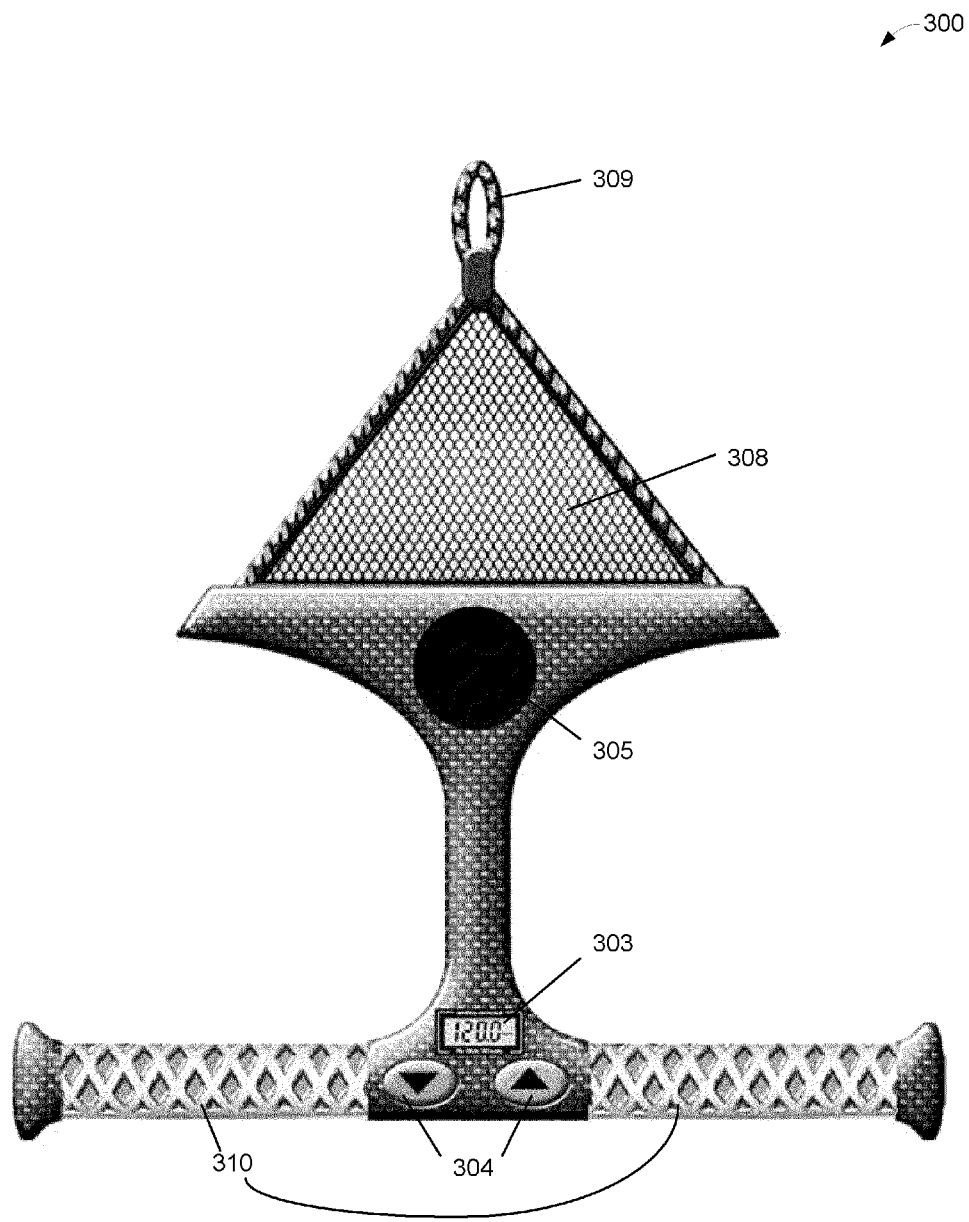
FIG. 3 illustrates one embodiment of the invention showing a front view.

FIG. 3 illustrates, generally at 300, one embodiment of the invention showing a front view of a tow handle. This tow handle is shown as a watersport tow handle, however, the invention is not so limited and any tow handle for towing a person may benefit from the techniques described (e.g. rope tow for snow skier). At 303 is a display unit, for example, for showing the status of a command or a current status. For example display unit 303 could display the current speed of a boat or the rider's speed (e.g. a speedometer). At 304 are controls, for example, control buttons. 304 controls could be used, for example, to control the volume of speakers, speed of the boat, direction of the boat, etc. At 305 is a component sleeve. Aps, circuits, etc. may be inserted into the component sleeve. At 308 is a safety mesh. At 309 is shown a rope handle connection for a tow rope. At 310 are handle grips. The ski handle as shown in FIG. 3 is but one example and the invention is not so limited for example, whereas FIG. 3 shows handles originating from the center outward, an alternative embodiment may have a triangular shape where the base of the triangle is used for a handle.

Figure 4:
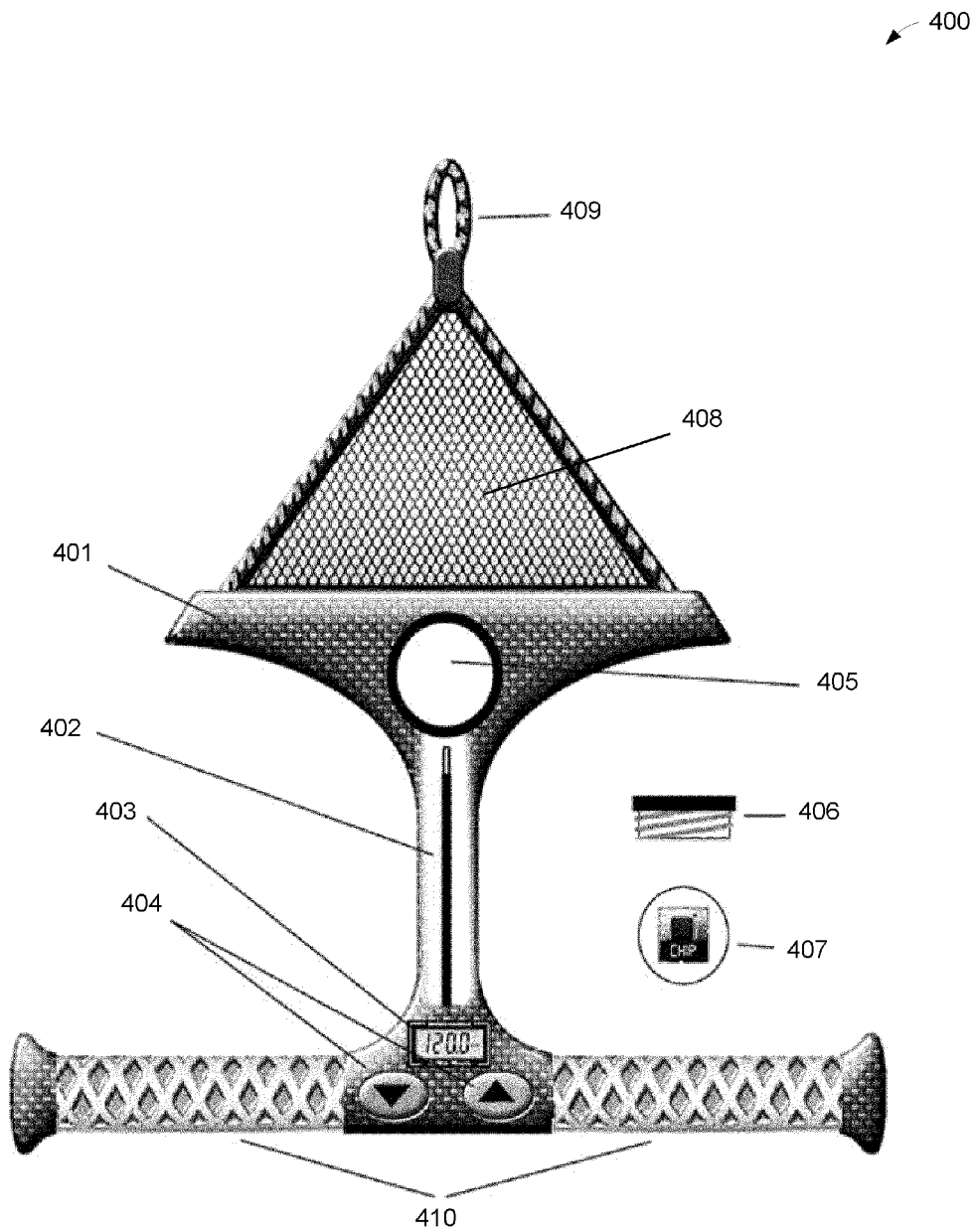
FIG. 4 illustrates one embodiment of the invention showing an inner view.

FIG. 4 illustrates, generally at 400, one embodiment of the invention showing an inner view of a T-shaped handle. At 401 is a ski handle. At 402 is shown wiring in the handle, at 403 a display unit, at 404 control buttons, at 405 a component sleeve, at 406 a threaded component housing, at 407 a hidden (from outside view) control component, at 408 a mesh, at 409 a connection for a tow rope, and at 410 handle grips. In one embodiment, hidden control component 407, for example, an integrated circuit may be placed in the component sleeve 405 and secured in place (watertight seal) with the threaded component housing 406. In this way aps and other capabilities may be easily added to the handle. For example, one ap may control just a speedometer display in say miles per hour, whereas a different ap may show kilometers per hour.

Figure 5:
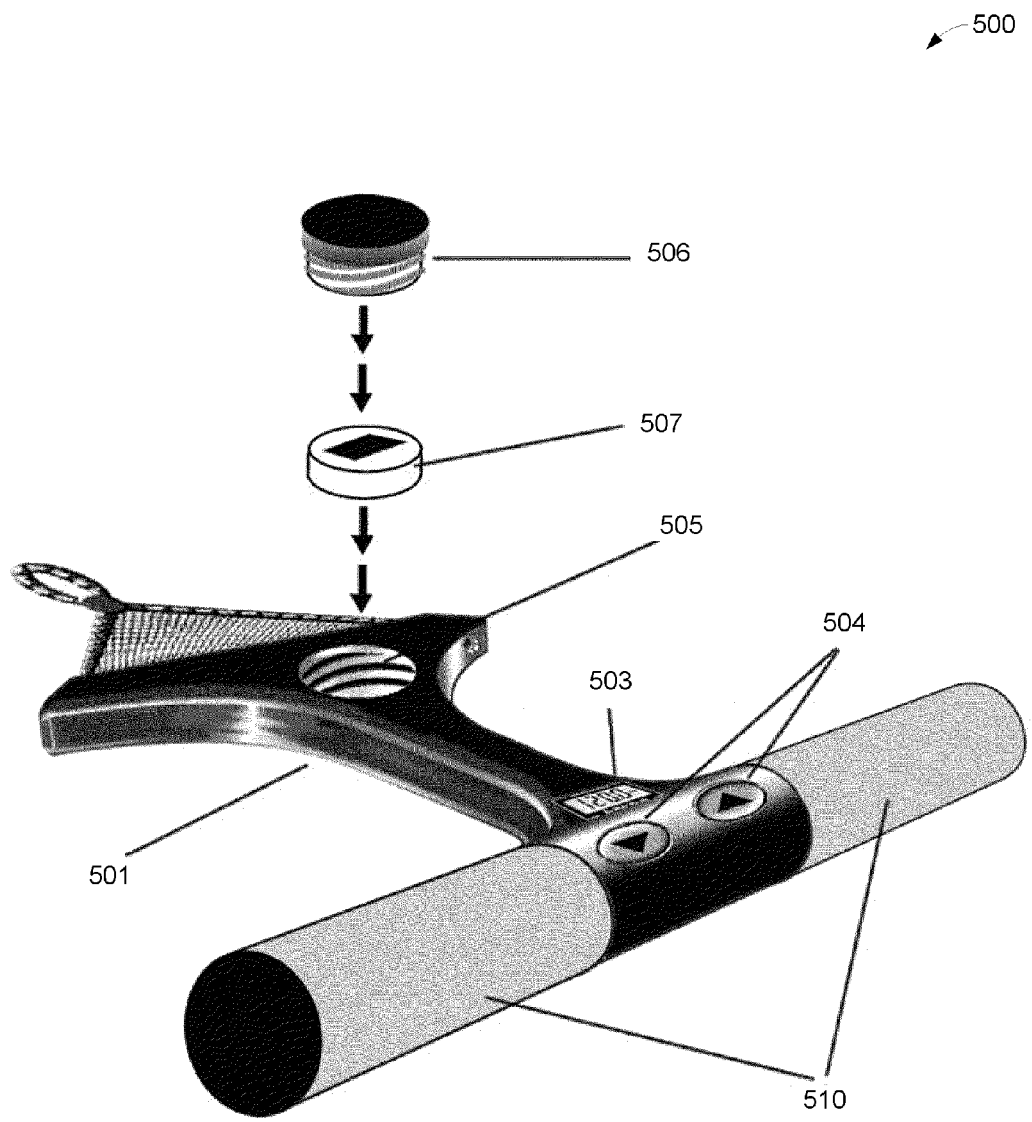
FIG. 5 illustrates one embodiment of the invention showing an assembly view.

FIG. 5 illustrates, generally at 500, one embodiment of the invention showing an assembly view. At 501 is a ski handle, at 503 is a display unit, for example, a height display, at 504 are control button switches, at 505 is a component sleeve, at 506 is a threaded component housing, at 507 is a hidden control component, and at 510 are handle grips.

One of skill in the art will appreciate that wireless components may be used with a wireless receiver to communication between a handle and a boat. Thus control of such things as releasing a flag is easily accomplished under electronic control of, for example, a solenoid. Wireless communications is also easily added as a component. Such features are well within the knowledge of one skilled in the art. Additionally, in one embodiment, GPS (global positioning satellite) capability is present.

While discussions have indicated that the boat is operated by a human, the invention is not so limited, and in an embodiment of the invention, without an operator in the boat the rider may control all functions including retrieval. For example, the rider may enter the water, control the boat speed and direction, and when the rider is down, the down flag is deployed, ballast tanks may be emptied, the boat knowing the last GPS position of the rider can return at slow speed and then stop if necessary within a distance, say for example, 30 feet. Should the rider not take action within a predetermined time, say for example, 3 minutes of arriving where the rider is down may take emergency actions (with the assumption the rider is knocked out or in real trouble) such as but not limited to calling authorities and noting the issue and providing GPS coordinates, having the boat stay within, say for example, 30 feet of the rider for easier rescue locating from the water or sky. What is to be appreciated is the Total Control Handle allows the rider total control.

Figure 6:
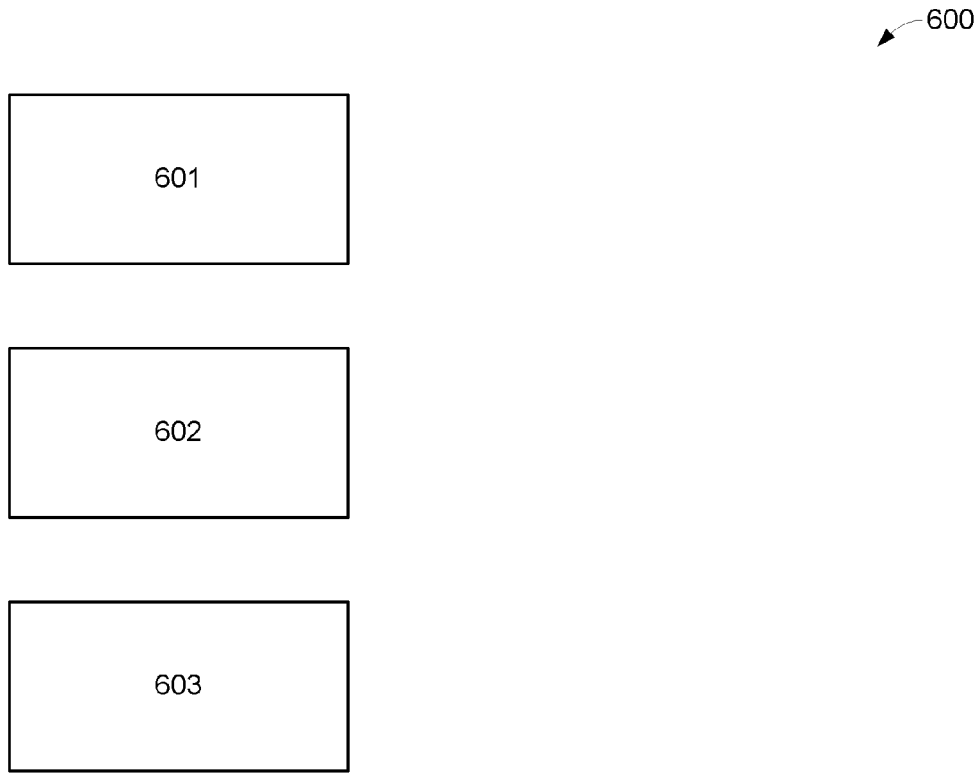
FIG. 6 shows various embodiments of the invention.

FIG. 6 shows, generally at 600, various embodiments of the invention.

Figure 7:
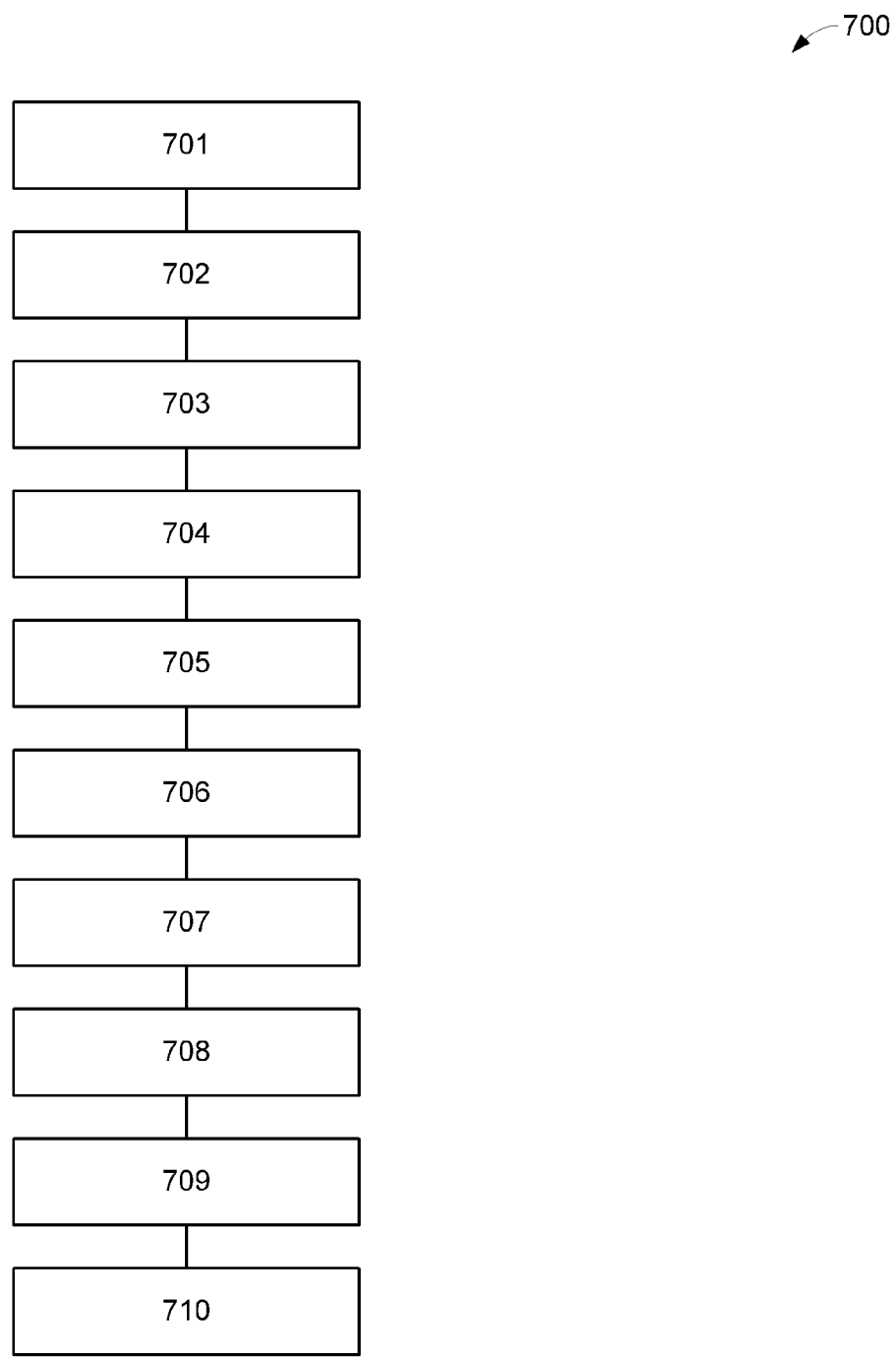
FIG. 7 illustrates various embodiments of the invention.

FIG. 7 illustrates, generally at 700, various embodiments of the invention. At 701 is receiving from a ski handle having a display inputs from a towed ski rider. At 702 the inputs received from the skier on the handle are communicated to a hidden control compartment. At 703 hidden control components process the communicated ski handle inputs into one or more control signals. At 704 the one or more control signals are transmitted to a receiver on the towing boat. At 705 the received one or more control signals are converted into commands for effecting the control functions. At 706 the towed rider has attached a wireless system. At 707 the distance from the rider to the ski handle is determined by measuring the wireless round trip time between the rider's wireless system and the ski handle and when greater than a pre-specified distance the ski handle transmits a fallen rider control signal to the receiver on the towing boat. At 708 the fallen rider control signal is converted into one or more commands for emptying ballast tanks and raising a skier down warning flag. At 709 the towing boat is slowed down. At 710 the fallen rider is located in the water.

At 1. A ski handle comprising:
  a tow rope connection;
  a component sleeve for inserting applications and hardware;
  one of more control buttons, said one or more control buttons operatively coupled to any said inserted applications and hardware;
  a display unit, said display unit operatively coupled to any said inserted applications and hardware; and
  one or more grips on said ski handle.

At 2. A handle comprising:
  a component sleeve said component sleeve an integral part of said handle;
  a component housing, said component housing proximately located on a top portion of said component sleeve and forming a watertight seal therewith;
  one or more control buttons, said one or more control buttons connected via one or more electrical wires to an interior portion of said component sleeve; and
  one or more handle grips, said one or more handle grips an integral part of said handle.

At 3. A method for a towed rider to control functions in a towing boat, the method comprising:
  receiving from a ski handle inputs received from said towed rider;
  communicating said ski handle inputs to a hidden control component;
  using said hidden control component to process said communicated ski handle inputs into one or more control signals;
  transmitting said one or more control signals to a receiver on said towing boat;
  converting said received one or more control signals into commands for effecting said control functions.

One of skill in the art will appreciate that specific details on implementation are not germane to the techniques disclosed. For example, one of skill in the art understands that an application or a chip may be implemented in a variety of ways, for example, but not limited to an application specific integrated circuit, etc. Likewise a wireless module may make use of, but is not limited to, radio frequency, infrared, WiFi, WiMax, laser, etc. Temperature may be sensed by, but is not limited to, a diode, a thermistor, resistance temperature detectors, etc. Humidity may be sensed by, but is not limited to capacitive, resistive, thermal conductivity, etc. A rider status may be sensed by, but is not limited to, optoelectronic, optical, current sensing, voltage sensing, heat, etc., for example, on the handle. A controller (which includes, but is not limited to, a reporting module, a recording module (for example, speed, height, temperature, G-forces pulled, etc. of a performance) a controlling module, etc.) uses specialized hardware as described infra.

Thus a Method and Apparatus for Total Control Handle have been described.

FIG. 1 illustrates a network environment 100 from which the techniques described may be accessed and/or controlled. The network environment 100 has a network 102 that connects S servers 104-1 through 104-S, and C clients 108-1 through 108-C. More details are described below.

Figure 2:
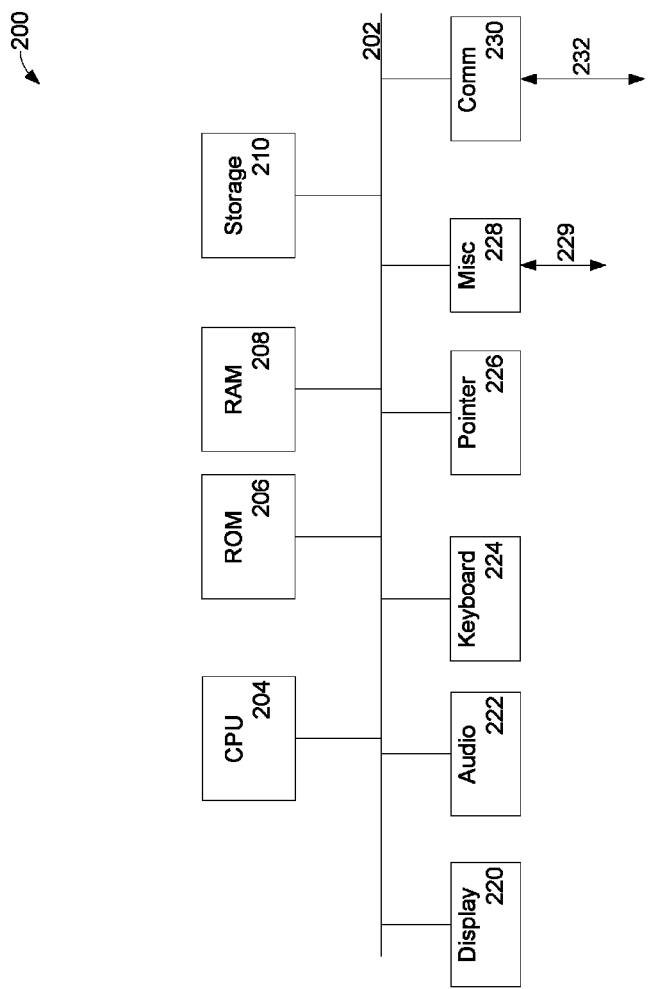
FIG. 2 is a block diagram of a computer system which some embodiments of the invention may employ parts of in conjunction with required specialized hardware.

FIG. 2 is a block diagram of a computer system 200 which some embodiments of the invention may employ parts of in conjunction with required specialized hardware and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be accessed and/or controlled. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be accessed and/or controlled by essentially any type of communicating means or device whether local or remote, such as a LAN, a WAN, a system bus, etc. For example, a network connection which communicates via for example wireless may control an embodiment of the invention having a wireless communications device. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228 via link 229, and communications 230 via port 232. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc., all non-transitory medium. Display 220 might be, for example, used by an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate non-transitory physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a non-transitory computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of non-transitory media suitable for storing electronic instructions either local to the computer or remote to the computer.

The techniques presented herein are specifically related to particular computer or other apparatus. A specialized apparatus to perform the required methods is required. For example, any of the methods according to the present invention can be implemented in hard-wired circuitry specifically designed for the functionality disclosed, or by programming special hardware having, for example, in one embodiment, a particular machine such as a computer (or CPU) specifically designed with a 4 bit or greater barrel shift register and a carry look ahead arithmetic logic unit. As disclosed Applicant submits that any results are tied to a particular machine or apparatus and/or transform a particular article into a different state or thing and that such particulars and/or things are non-trivial. For example, in FIG. 2 at 220 is a display. The results of the specialized machine may return an electronic value and such a value can be stored in hardware on the specialized machine and transformed into a graphical representation that can be displayed to a user of the computer. For example, in one embodiment, the returned value may be stored as a group of physical electrons on a trapped gate of a flash memory device. These physical electrons may then be transformed into a graphical representation, for example, by twisting the molecules of a liquid crystal display so that a carrier signal can be modulated and produces on reception a molecular change in a rod and cone receptor of a human user to produce physical electrons thus producing a tangible useful result and transformation tied to a particular machine such as a computer specifically designed with a 4 bit or greater barrel shift register and a carry look ahead arithmetic logic unit. For example the specialized hardware is required for logical operations and comparisons of values. For example, in one embodiment, the returned value may be stored as a series of holes on a paper tape that may be read by a person (e.g. a blind person) by tactile sensation (e.g. output from a KSR-33 Teletype). As disclosed Applicant submits that these results are tied to a particular machine or apparatus and/or transform a particular article into a different state or thing and that such particulars and/or things are non-trivial and as such satisfy Bilski.

The methods of the invention may be implemented using computer software on the specialized hardware as noted supra. If written in a programming language conforming to a recognized standard, sequences of instructions designed to implement the methods can be compiled for execution on the specialized hardware. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action and produce a tangible concrete non-transitory result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a specialized computer system in which the techniques of the present invention may be practiced as well as implemented as an embodiment).

A machine-readable medium is understood to include any non-transitory mechanism for storing or transmitting information in a form readable by a machine (e.g., a computer). For example, a non-transitory machine-readable medium includes read only memory (ROM); random access memory (RAM); magnetic disk storage media; optical storage media; flash memory devices; devices having non-transitory storage.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a Method and Apparatus for Total Control Handle have been described.

What is claimed is:

1. A method for a towed rider to control functions in a towing boat, the method comprising:
   receiving from a ski handle inputs received from said towed rider, wherein said ski handle has a display;
   communicating said ski handle inputs to a hidden control component;
   using said hidden control component to process said communicated ski handle inputs into one or more control signals;
   transmitting said one or more control signals to a receiver on said towing boat;
   converting said received one or more control signals into commands for effecting said control functions;
   wherein said towed rider has attached to them a wireless system; and
   sensing when said towed rider is separated a pre-specified distance from said ski handle by measuring wireless round trip time between said wireless system and said ski handle and transmitting from said ski handle a fallen rider control signal to said receiver on said towing boat.

2. The method of claim 1 wherein said fallen rider control signal is converted into one or more said commands for emptying ballasts of said towing boat and raisin a ski warning flag.

3. The method of claim 2 further comprising slowing said towing boat.

4. The method of claim 3 further comprising locating said fallen rider.

* * * * *